(12) United States Patent
Cheng

(10) Patent No.: US 7,490,864 B2
(45) Date of Patent: Feb. 17, 2009

(54) JOINT DEVICE

(75) Inventor: Chen-Bong Cheng, Kowloon (HK)

(73) Assignee: Merits Health Products Co., Taichung (TW)

( * ) Notice: Subject to any disclaimer, the term of this patent is extended or adjusted under 35 U.S.C. 154(b) by 422 days.

(21) Appl. No.: 11/325,658

(22) Filed: Jan. 4, 2006

(65) Prior Publication Data
US 2007/0152443 A1    Jul. 5, 2007

(51) Int. Cl.
*F16L 37/00* (2006.01)
*B67C 3/00* (2006.01)

(52) U.S. Cl. .................. 285/317; 141/349; 141/383; 137/614.05

(58) Field of Classification Search .......... 285/317; 141/2–4, 18, 21, 348–353, 383–385; 222/3; 137/614.05; 251/149.1
See application file for complete search history.

(56) References Cited

U.S. PATENT DOCUMENTS

| 593,190 | A | * | 11/1897 | Bernhardt | 285/317 |
| 793,103 | A | * | 6/1905 | Scholtz | 285/113 |
| 1,150,420 | A | * | 8/1915 | Davis et al. | 285/308 |
| 1,480,555 | A | * | 1/1924 | Ingram | 285/35 |
| 2,680,546 | A | * | 6/1954 | Seaberg | 141/384 |
| 3,136,344 | A | * | 6/1964 | Kollodge | 141/383 |
| 3,320,981 | A | * | 5/1967 | Loewenthal | 141/302 |
| 4,220,360 | A | * | 9/1980 | Jacek et al. | 285/317 |
| 4,884,410 | A | * | 12/1989 | Bell et al. | 62/77 |
| 4,928,859 | A | * | 5/1990 | Krahn et al. | 222/402.14 |
| 5,447,343 | A | * | 9/1995 | Gajewski et al. | 285/317 |
| 5,649,723 | A | * | 7/1997 | Larsson | 285/34 |
| 6,895,952 | B1 | * | 5/2005 | Bachelder | 126/25 R |
| 6,955,194 | B2 | * | 10/2005 | MacNeal et al. | 141/4 |
| 2003/0025326 | A1 | * | 2/2003 | Schulte | 285/316 |
| 2004/0221919 | A1 | * | 11/2004 | MacNeal et al. | 141/384 |

FOREIGN PATENT DOCUMENTS

WO    WO 9423236 A1  *  10/1994

* cited by examiner

*Primary Examiner*—James M. Hewitt
(74) *Attorney, Agent, or Firm*—William E. Pelton, Esq.; Cooper & Dunham LLP

(57) ABSTRACT

A joint device has a joint and a connecting device. The joint is mounted with a gas container and has a leakage proof element, a gas-inlet and a threaded stub. The leakage proof element is mounted with the gas-inlet and has a head, an outer annular groove and a connecting portion. The connecting device is covered with the leakage proof element and has a head holder, a connecting tube, two pivotal pins, two buckling elements and two springs. The head holder is mounted with the connecting tube and has two pinholes and through holes formed on the external surface. The buckling elements are connected with the head holder by the pivotal pins and each buckling element has a tab, a connecting arm and a pillar locked with the outer annular groove. The springs are mounted between the connecting tube and the tabs, and respectively contacted to the tabs.

4 Claims, 6 Drawing Sheets

JOINT DEVICE

BACKGROUND OF THE INVENTION

1. Field of the Invention

The present invention relates to a joint device, and more particularly to a joint device mounted with a gas container and can be operated quickly and safely.

2. Description of Related Art

With reference to FIG. 6, a conventional gas container (60) includes a body (61) and a joint (62). The body (61) has a top, a bottom and a threaded hole. The threaded hole is defined on the top of the body (61).

The joint (62) is mounted in the threaded hole of the body (61). The joint (62) has a side, an external surface and a gas-inlet (621). The gas-inlet (621) is formed on the side of the joint (62).

When the gas in the body (61) is used up, the gas container (60) should be refilled with gas from a gas storage device by a connecting device (70).

The connecting device (70) has an internal surface, a pillar (71), a proximal end, a distal end and a positioning shaft (72). The pillar (71) is formed on the internal surface near the proximal end corresponding to the gas-inlet (621) and has a through hole. The positioning shaft (72) is screwed in the distal end of the connecting device (70) and opposite to the pillar (71).

A pressure gauge (80) is mounted with the connecting device (70) and has a front end and a rear end. The pressure gauge (80) can measure the gas pressure in the gas container (60). The connecting device (70) is combined with the rear end of the pressure gauge (80).

A hose (90) is connected with the pressure gauge (80) and has a distal end and a proximal end. The proximal end of the hose (90) is connected to the pressure gauge (80), and the distal end of the hose (90) is connected to the gas storage device.

To connect the connecting device (70) onto the joint (62), the connecting device (70) is mounted over the joint (62) and the pillar (71) is inserted to the gas-inlet (621) to make the through hole in the pillar (71) communicating with the gas-inlet (621). Then, the positioning shaft (72) is turned to abut the external surface of the joint (62) to secure the connecting device (70) on the joint (62). Accordingly, the gas in the gas storage device can be led into the body (61) of the gas container (60) via the hose (90), the pressure gauge (80), the through hole in the pillar (71) and the gas-inlet in the joint (62).

However, the conventional joint (62) on the gas container (60) has several defects and restrictions as follows:

1. To avoid gas leakage from occurring, the positioning shaft (72) on the connecting device (70) must be rotated over and over to make the pillar (71) and the gas-inlet (621) combined tightly and this is time-consuming and laborious.

2. In addition, because the gas-inlet (621) is just a hole in the joint (62) and does not has any leakage proof element to prevent the gas leakage, this may pollutes the surrounding and be dangerous when the gas in the gas container (60) is volatile gas or toxic gas.

SUMMARY OF THE INVENTION

The main objective of the present invention is to provide a joint device for a gas container.

A joint device for a gas container has a joint and a connecting device. The joint is mounted with the gas container and has a leakage proof element, a gas-inlet and a threaded stub. The leakage proof element is mounted with the gas-inlet and has a head, an outer annular groove and a connecting portion. The connecting device is covered with the leakage proof element and has a head holder, a connecting tube, two pivotal pins, two buckling elements and two springs. The head holder is mounted with the connecting tube and has two pinholes and through holes formed on the external surface. The buckling elements are connected with the head holder by the pivotal pins and each buckling element has a tab, a connecting arm and a pillar locked with the outer annular groove. The springs are mounted between the connecting tube and the tabs, and respectively contacted to the tabs of the buckling elements and opposite to each other.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
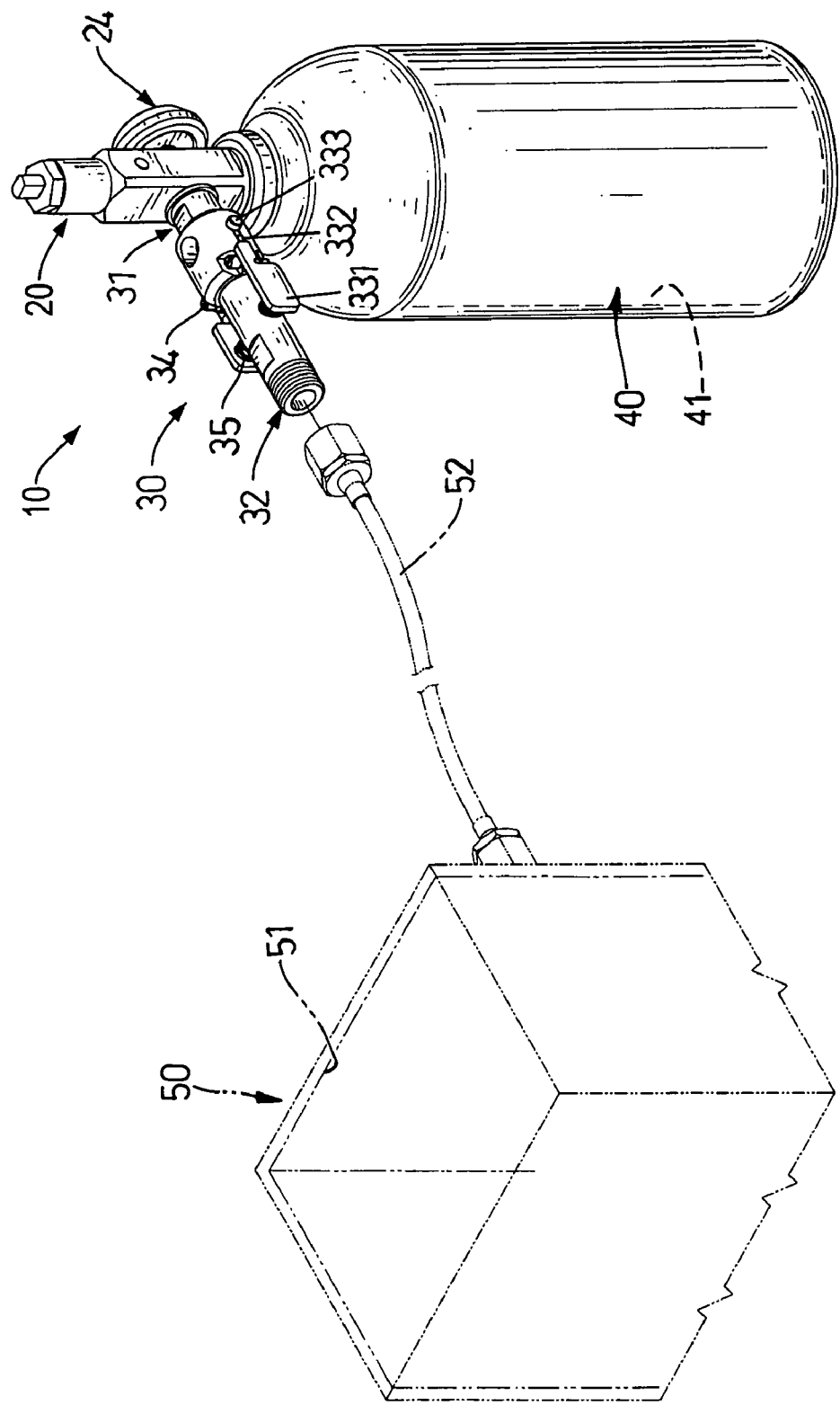
FIG. 1 is a perspective view of a gas container with a joint device in accordance with the present invention connected to a gas storage device with a hose.

With reference to FIG. 1, a joint device (10) for a gas container (40) in accordance with the present invention is connected to a gas storage device (50) with a hose (52) to fill gas into the gas container (40).

The gas storage device (50) has a container (51) and a hose (52). The hose (52) is connected with the container (51) and has a distal end and a proximal end. The proximal end of the hose (52) is mounted with the joint device (10), and the distal end of the hose (52) is connected to the container (51).

Figure 3:
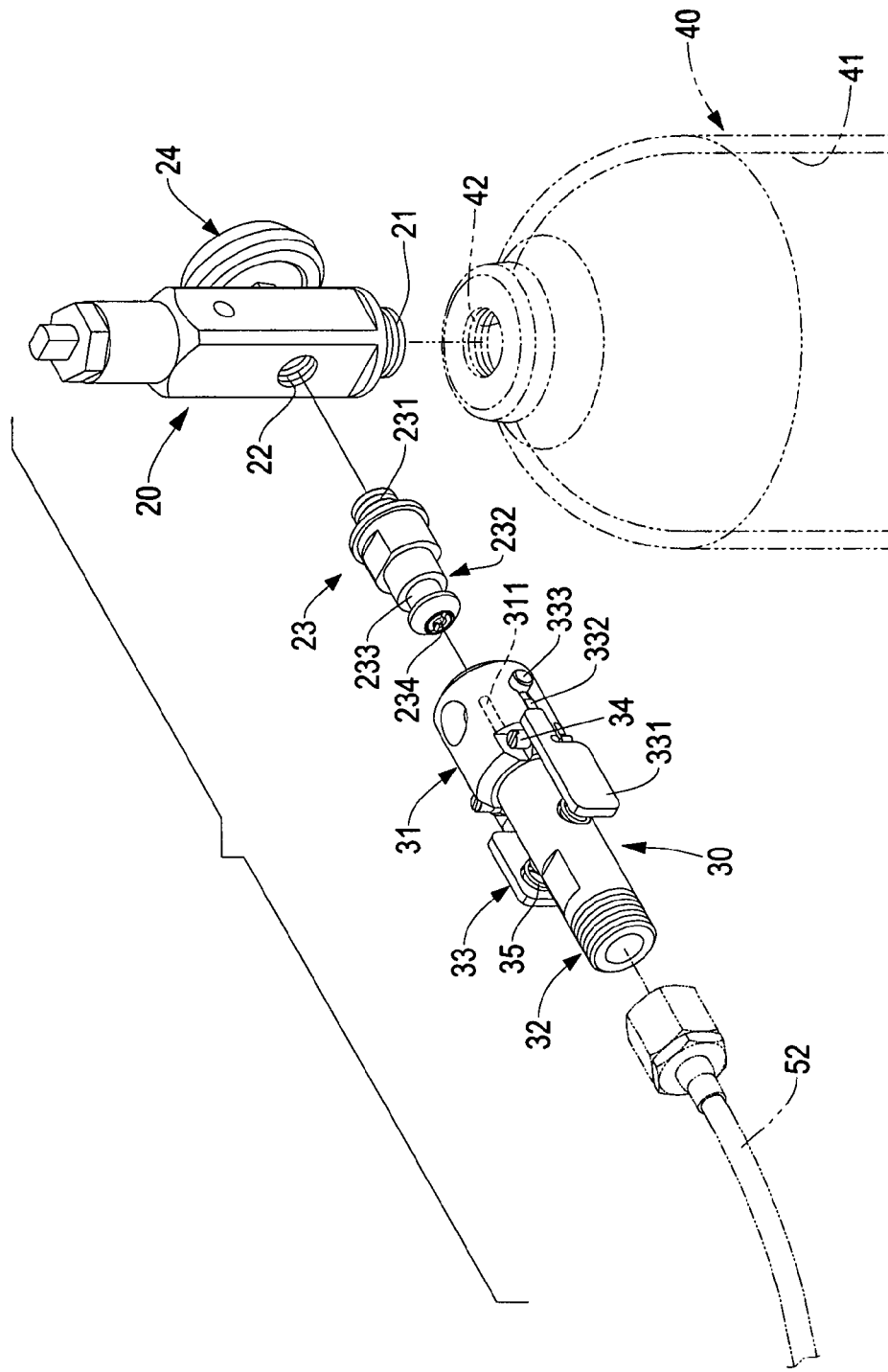
FIG. 3 is an exploded perspective view of the joint device in FIG. 1.

With reference to FIGS. 1 and 3, the gas container (40) has a body (41) and a threaded hole (42). The threaded hole (42) is defined on the top of the body (41).

Figure 2:
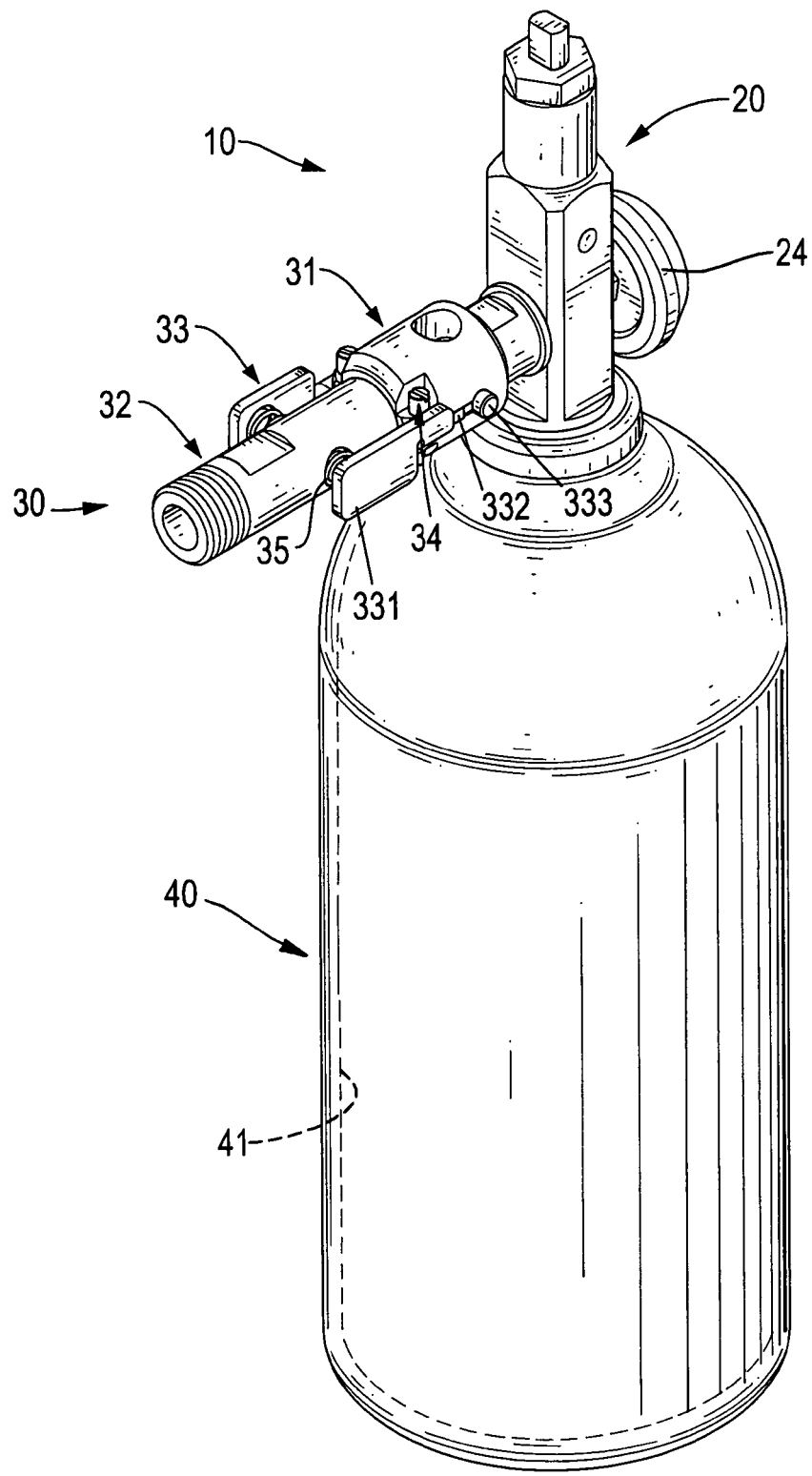
FIG. 2 is a perspective view of the gas container with the joint device in FIG. 1.

With reference to FIGS. 2 and 3, the joint device (10) in accordance with the present comprises a joint (20) and a connecting device (30).

The joint (20) is mounted on the threaded hole (42) in the gas container (40). The joint (20) has a bottom, a front side, a rear side, an external surface, a threaded stub (21), a gas-inlet (22), a leakage proof element (23) and a pressure gauge (24).

The threaded stub (21) is formed on the bottom of the joint (20) and is screwed with the threaded hole (42) in the body (41). The gas-inlet (22) is formed in the front side and has an internal surface and an internal thread. The internal thread is formed on the internal surface of the gas-inlet (22).

The leakage proof element (23) is mounted on the gas-inlet (22) and can keep gas leakage from occurring and has a proximal end, a distal end, an external surface, a connecting portion (231), a head (232) and an outer annular groove (233). In practice, the leakage proof element (23) can be a check valve. The connecting portion (231) is formed on the proximal end of the leakage proof element (23) and has an external surface and an external thread. The external thread is formed on the external surface of the connecting portion (231) and is screwed with the inner thread in the gas-inlet (22) to connect the leakage proof element (23) to the gas-inlet (22). The head (232) is formed on the distal end of the leakage proof element (23) and has a filling hole (234). The outer annular groove (233) is formed on the external surface of the leakage proof element (23) near the head (232).

The pressure gauge (24) is attached to the rear side of the joint (20) to measure the gas pressure in the gas container (40).

The connecting device (30) is combined with the leakage proof element (23) on the joint (20). The connecting device (30) is tubular and has a proximal end, a distal end, a head holder (31), a connecting tube (32), two buckling elements (33), two pivotal pins (34) and two springs (35). The head holder (31) is hollow and is formed on the proximal end, and the connecting tube (32) is formed on the distal end of the connecting device (30).

The head holder (31) holds the head (232) inside and has a front end, a rear end, an internal surface, an external surface, a center, two pinholes, two through holes and an inserting member (311). The rear end of the head holder (31) is combined with the connecting tube (32), and the front end faces to the head (232). The pinholes are defined in the external surface and opposite to each other near the rear end of the head holder (31). The through holes are formed from the external surface to the internal surface and correspond to the two pinholes. The inserting member (311) is mounted at the center of the head holder (31) and has an air passage extending through the inserting member (311).

The connecting tube (32) has a front end, a rear end, an external surface, two grooves, two concavities and an outer thread. The rear end of the connecting tube (32) is connected with the rear end of the head holder (31). The outer thread is formed on the external surface of the connecting tube (32) near the front end and is screwed with the proximal end of the hose (52). The grooves are formed on the external surface between the front end and the rear end and correspond to the pinholes. The concavities are formed on the external surface of the connecting tube (32) near the front end.

The pivotal pins (34) are inserted respectively into the pinholes.

The buckling elements (33) are connected with the head holder (31) by the pivotal pins (34), and each buckling element (33) has a tab (331), a connecting arm (332) and a pillar (333). Each tab (331) has an action end and a pivot end. The action end of the tab (331) correspond respectively to the grooves on the connecting tube (32), and the pivot ends are connected respectively with the pinholes in the head holder (31) with the pivotal pins (34). The connecting arm (332) is combined between the tab (331) and the pillar (333). Each pillar (333) is fitting in the through hole of the head holder (31) and the pillar (333) has a hooked end engaged with the outer annular groove (233) of the leakage proof element (23).

The springs (35) are mounted respectively in the concavities on the connecting tube (32) and abut respectively the tabs (331) of the buckling elements (33).

Figure 4:
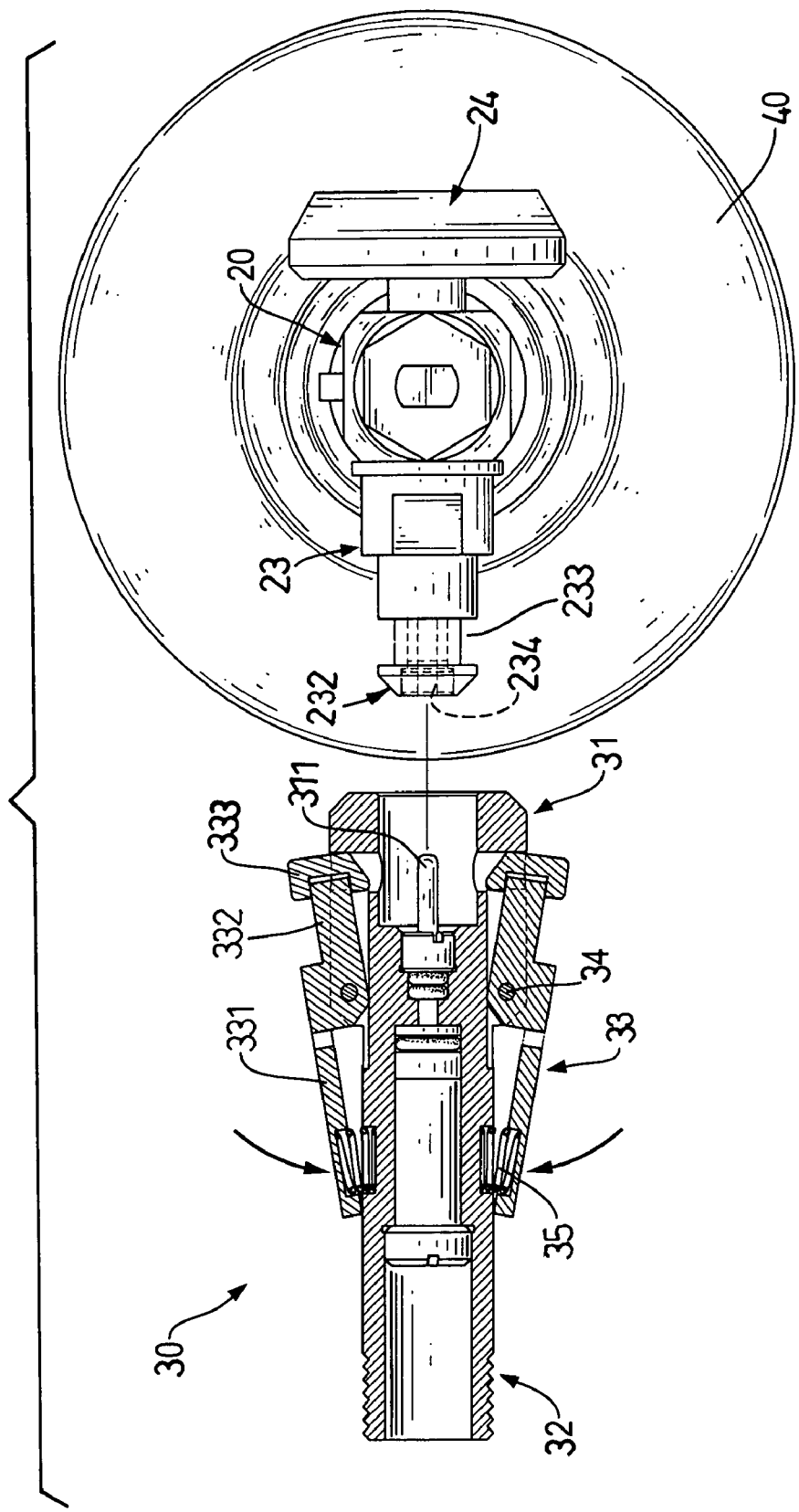
FIG. 4 is an operational exploded top plan view in partial cross section of the joint device in FIG. 1.
Figure 5:
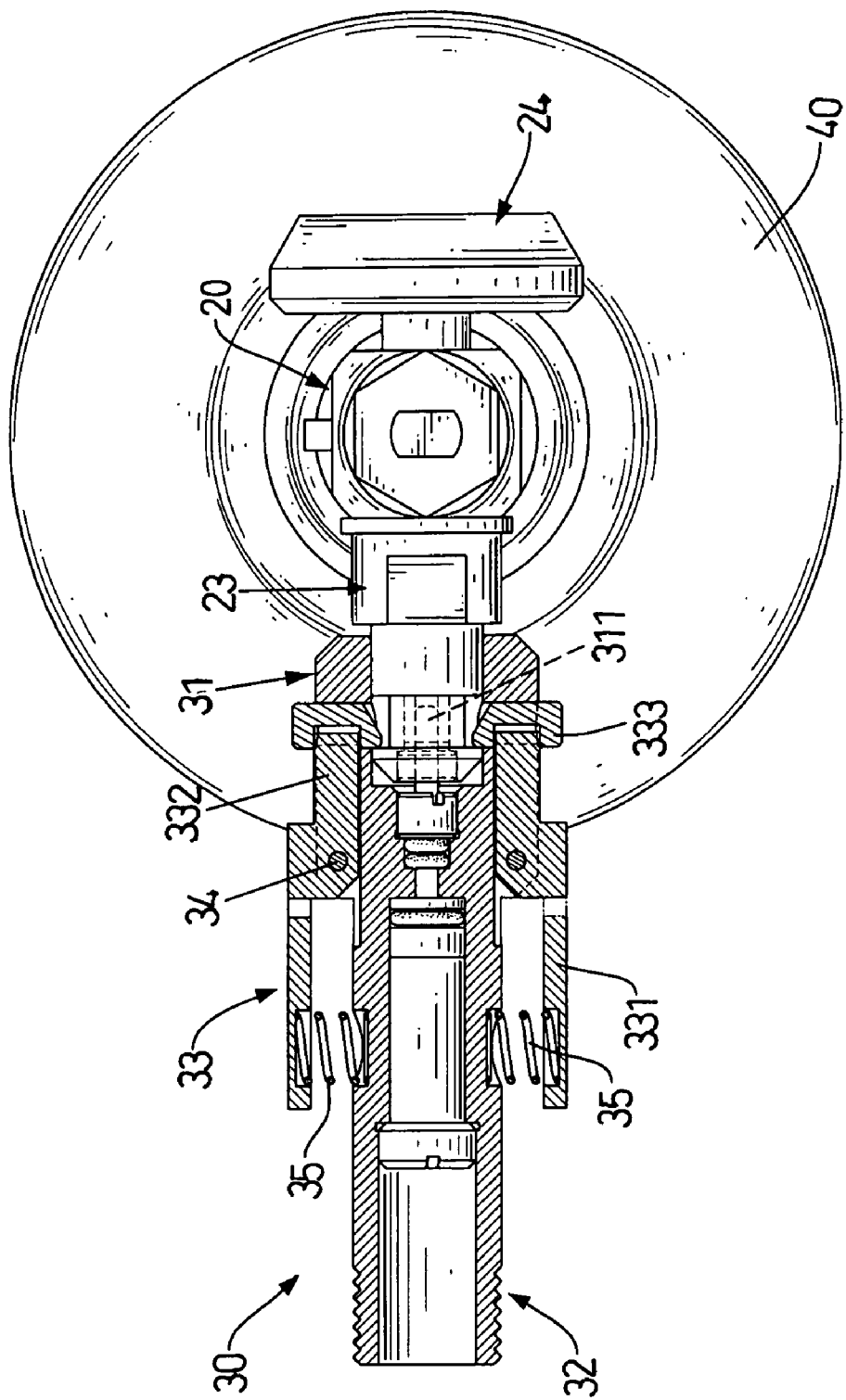
FIG. 5 is a top plan view in partial cross section of the joint device in FIG. 1.
Figure 6:
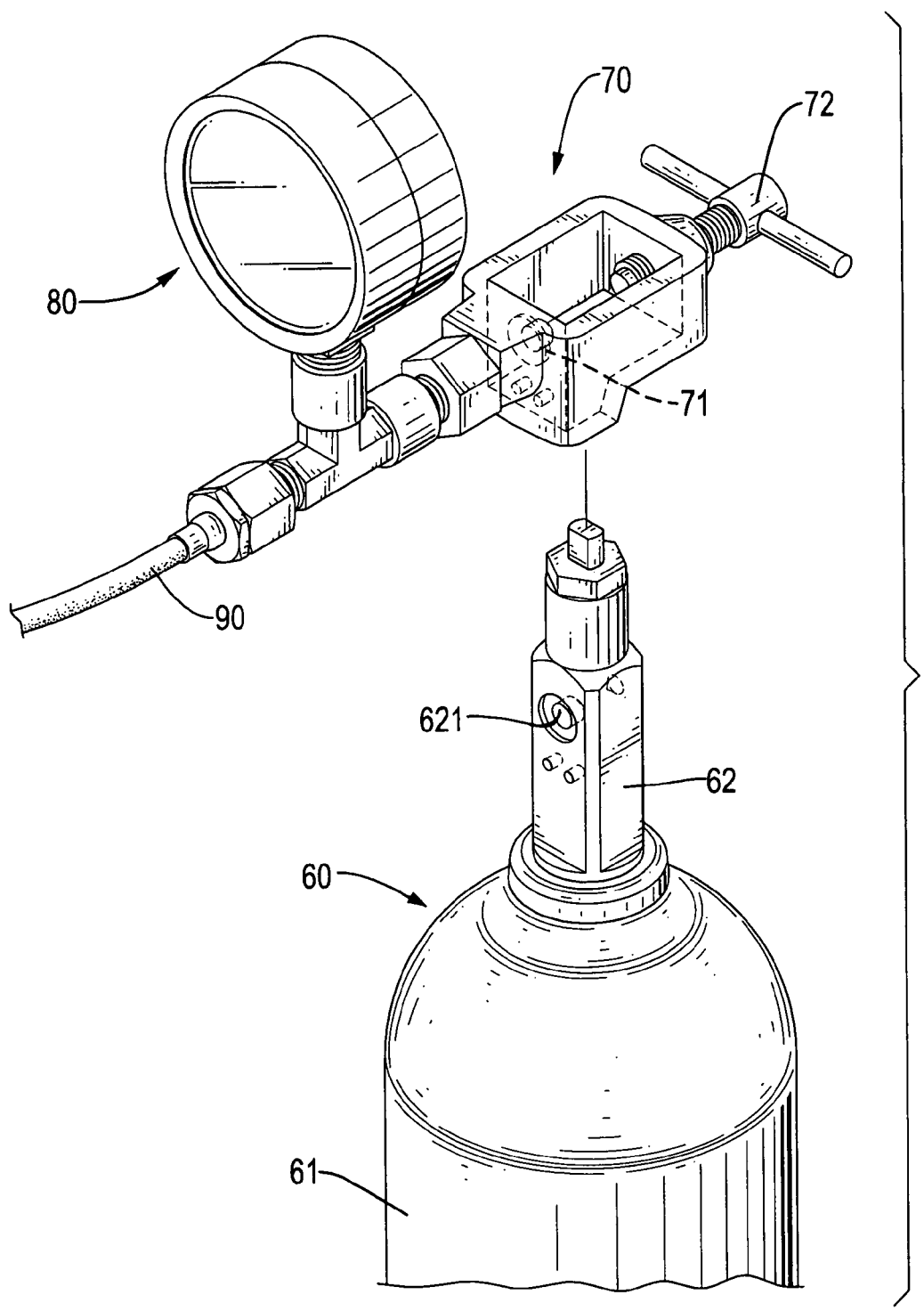
FIG. 6 is an exploded perspective view of a conventional gas container with a joint device in accordance with the prior art.

With further reference to FIG. 4, when the head (232) of the leakage proof element (23) is inserted into the head holder (31), the pillars (333) will be pushed by the head (232) to pivotally rotate the buckled elements (33) relative to the head holder (31). Then the inserting member (311) is inserted into the filling hole (234). The hooked ends of each pillar (333) are automatically engaged with outer annular groove (233) with the resilient force provided by the springs (35) when the head (232) passes over the pillars (333) as shown in FIG. 5 so as to connect the connecting device (30) with the joint (20).

The advantages and efficiencies of the present invention are as follows:

1. When the connecting device (30) is inserted with the joint (20), the buckling elements (33) on the connecting device (30) will automatically engage with the outer annular groove (233) in the joint (20). Therefore, to connect the connecting device (30) with the joint (20) is easy and convenient.

2. The joint device (10) can avoid the gas leak to the atmosphere. The joint (20) has a leakage proof element (23) combining with the gas-inlet (22), and then it can resist the gas leak in the air from the gas-inlet (22) and prevent the gas pollute the environment.

Even though numerous characteristics and advantages of the present utility model have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A joint device for a gas container having a body with a top and a bottom and a threaded hole defined on the top of the body, and the joint device having
    a joint comprising
        a bottom;
        a front side;
        a rear side opposite to the front side;
        an external surface;
        a threaded stub formed on the bottom of the joint and adapted to be screwed with the threaded hole in the body;
        a gas-inlet formed in the front side and having
            an internal surface; and
            an internal thread formed on the internal surface;
        a leakage proof element mounted on the gas-inlet and having
            a proximal end;
            a distal end;
            an external surface;
            a connecting portion formed on the proximal end of the leakage proof element and having
                an external surface; and
                an external thread formed on the external surface of the connecting portion and screwed with the internal thread in the gas-inlet;
            a head formed on the distal end of the leakage proof element and having a filling hole; and
            an outer annular groove formed on the external surface of the leakage proof element near the head; and
    a connecting device combined with the leakage proof element of the joint, being tubular and having
        a proximal end;
        a distal end;
        a head holder formed on the proximal end, being hollow and holding the head inside and having
            a front end faced to the head;
            a rear end of the head holder combined with a connecting tube;
            an internal surface;
            an external surface;
            a center;

two pinholes formed in the external surface and opposite to each other near the rear end of the head holder;

two through holes formed from the external surface to the internal surface and corresponding to the two pinholes; and an inserting member mounted at the center of the head holder and having an air passage extending through the inserting member; and a connecting tube formed on the distal end of the connecting device and having a front end;

a rear end combined with the rear end of the head holder;

an external surface;

an outer thread formed on the external surface of the connecting tube near the front end;

two grooves formed on the external surface between the front end and the rear end and corresponding to the pinholes; and two concavities formed on the external surface of the connecting tube near the front end;

two pivotal pins inserted respectively into the pinholes;

two buckling elements connected to the head holder by the pivotal pins and each buckling element having a tab having an action end set corresponding to one of the grooves of the connecting tube; and a pivot end connected to one of the pinholes of the head holder by one of the pivot pins;

a connecting arm connected to the tab; and a pillar connected to the connecting arm and fitted into one of the through holes of the head holder and having a hooked end engaged with the outer annular groove of the leakage proof element; and two springs mounted respectively in the concavities on the connecting tube and contacted respectively with the tabs of the buckling elements.

2. The joint device as claimed in claim 1, wherein a pressure gauge is mounted in the rear side of the joint to measure the gas pressure in the gas container.

3. The joint device as claimed in claim 2, wherein the leakage proof element is a check valve.

4. The joint device as claimed in claim 1, wherein the leakage proof element is a check valve.

\* \* \* \* \*